US006727797B1

United States Patent

Bruchmann

(10) Patent No.: US 6,727,797 B1

(45) Date of Patent: Apr. 27, 2004

(54) FUSE COMBINATION UNIT WITH MAINTAINED LOCKING

(76) Inventor: Klaus Bruchmann, Am Oelberg 7a, D-96450 Coburg (DE)

( * ) Notice: Subject to any disclaimer, the term of this patent is extended or adjusted under 35 U.S.C. 154(b) by 171 days.

(21) Appl. No.: 10/031,943

(22) PCT Filed: Jul. 20, 2000

(86) PCT No.: PCT/EP00/06945

§ 371 (c)(1), (2), (4) Date: Apr. 29, 2002

(87) PCT Pub. No.: WO01/08180

PCT Pub. Date: Feb. 1, 2001

(30) Foreign Application Priority Data

Jul. 22, 1999 (DE) ........................................ 199 34 542
Jul. 22, 1999 (DE) ........................................ 299 12 853

(51) Int. Cl.$^7$ ........................ H01M 85/25; H01M 85/54

(52) U.S. Cl. ........................ 337/210; 337/194; 337/196; 337/225; 337/250; 361/626; 361/642

(58) Field of Search ................................ 337/187, 186, 337/194, 196, 210, 211, 212, 225, 250; 361/626, 642, 646, 833, 837

(56) References Cited

U.S. PATENT DOCUMENTS

| | | | | |
|---|---|---|---|---|
| 2,030,506 A | * | 2/1936 | Driescher | 337/284 |
| 2,243,528 A | * | 5/1941 | Grinnell | 29/278 |
| 2,275,903 A | * | 3/1942 | Hermann | 294/19.1 |
| 2,313,364 A | * | 3/1943 | Schultz | 337/195 |
| 2,949,517 A | * | 8/1960 | McBride | 337/223 |
| 3,194,926 A | * | 7/1965 | Ustin | 337/215 |
| 3,406,365 A | * | 10/1968 | Lameyre | 337/211 |
| 5,076,118 A | * | 12/1991 | Lawson | 81/3.8 |
| 5,186,637 A | * | 2/1993 | Norden | 439/133 |
| 5,590,019 A | * | 12/1996 | Fox et al. | 361/643 |
| 5,969,587 A | * | 10/1999 | Combas | 335/132 |
| 6,650,222 B2 | * | 11/2003 | Darr et al. | 337/187 |

FOREIGN PATENT DOCUMENTS

| | | | | |
|---|---|---|---|---|
| DE | 3444564 A1 | * | 6/1986 | H02B/01/04 |
| DE | 34 06 815 C2 | | 10/1989 | |
| DE | 196 00 413 A1 | | 7/1996 | |
| EP | 0 198 460 A2 | | 9/1998 | |
| GB | 2 322 742 A | | 10/1986 | |

OTHER PUBLICATIONS

English language version of International Search Report for PCT/EP00/06945.

* cited by examiner

*Primary Examiner*—Anatoly Vortman

(74) *Attorney, Agent, or Firm*—Wood, Phillips, Katz, Clark & Mortimer

(57) ABSTRACT

A fused switch unit (1) is provided with a housing (2) in which a fuse plug (10) is arranged such that it can pivot to and fro between a switched-off position and a switched-on position. The fuse plug (10) has a grip part (11) and a retaining area (12) for a fuse link (20) and is capable of being pushed into the fused switch unit (1) as far as an operating position. Both the fused switch unit (1) and/or associated components (2, 30) as well as the grip part (11) of the fuse plug (10) each have a through-opening (15, 35). The through-openings (15, 35) are positioned such that they essentially do not overlap when the fuse plug (10) is in its operating position, and such that they are at least partially aligned with one another in order to hold an interlocking element (40) when the fuse plug (10) is in a position in which it is partially withdrawn from its operating position in the fused switch unit (1).

10 Claims, 5 Drawing Sheets

FUSE COMBINATION UNIT WITH MAINTAINED LOCKING

This application is an application filed under 35 U.S.C. Sec. 371 as a national stage of international application PCT/EP00/06945, which was filed Jul. 20, 2000.

TECHNICAL FIELD

The invention relates to a fused switch unit.

BACKGROUND OF THE INVENTION

Fused switch units such as these as well as the fuse plugs and switching rockers used in such fused switch units are used in widely differing configurations in buildings, in both private and commercial buildings, in particular in buildings in which machines are electrically operated. Furthermore, it is possible to use fused switch units such as these as well as components, for example the switching rocker or the fuse plug directly on or in machine elements or housings, for electrical protection of electrically operated machines.

A fused switch unit having a switching rocker and a fuse link is known, for example, from DE 34 06 815 C2. Fused switch units such as these are used to interrupt the circuit of, and hence the electrical supply to, machines and appliances automatically when the current intensity or the power in the circuit exceeds a specific, fixed value. In order to match these values to the circumstances, in particular to the electrical machines and appliances or external presets, for example safety presets, fuse links which have different characteristic values can be inserted into the fused switch units, or into the fuse plug.

Fused switch units such as these are also used, in particular, to reliably interrupt the circuit manually, in particular when it is necessary to carry out repairs on electrical appliances and machines. To this end, the switching rocker or the fuse plug is moved to its switched-off position together with the corresponding fuse link, which is mounted in a housing of the fused switch unit such that it can pivot between a switched-on position and a switched-off position. The circuit is thus interrupted so that it is possible, in particular, to carry out repairs safely to electrically operated machines and appliances.

However, there is a risk of the switching rocker or the fuse plug being moved accidentally from its switched-off position to the switched-on position, for example as a result of the elements having been set inaccurately and being in an intermediate position from which they drop back again to the switched-on position, or because a third party accidentally bumps against the apparatus or deliberately moves it to the switched-on position because he or she has not been informed that repairs are possibly still being carried out and that there is a possible hazard.

SUMMARY OF THE INVENTION

One object of the invention is thus to provide a fused switch unit which allows the switch plug to be protected easily and reliably in its switched-off position. In particular, it is in this case intended to be possible to use conventional apparatuses, which are not matched to a specific fused switch unit, and particularly also standard conventional interlocking apparatuses which are not related in any way to a fused switch unit, for this purpose.

This object is achieved by a fused switch unit according to the invention.

In order to protect the fuse plug in its switched-off position, the fuse plug is withdrawn from its operating position in the fused switch unit until the through-opening of the fuse plug is aligned with the through-opening in the fused switch unit or in a component of it, or the two through-openings overlap to such an extent, that an interlocking apparatus, for example a standard conventional padlock or a lead sealing wire, can be inserted through the two through-openings.

The fuse plug can be withdrawn from its operating position only in the switched-off position, since the fuse plug is otherwise held in its operating position by housing parts of the fused switch unit.

The expression "operating position" of the fuse plug means that position in which the fuse plug can still be pivoted between its switched-on position and its switched-off position, possibly in the switching rocker. The fuse plug is then no longer in its operating position when it is withdrawn from the fused switch unit or from the switching rocker to such an extent that it is no longer to pivot it to its switched-on position, since area elements of the fuse plug abut against housing parts of the fused switch unit.

It is thus possible, according to the invention, to use standard conventional interlocking apparatuses, for example conventional padlocks or lead sealing wires or the like, for interlocking. There is no need for specially produced interlocking apparatuses, which fit only selected fused switch units. There is thus no need to stock different interlocking apparatuses for different fused switch units. This is also helpful for the private area, since non-commercial users do not normally have special interlocking apparatuses.

Switching to the switched-on position is reliably prevented since the fuse plug must be withdrawn from its limit position in order to fit an interlocking apparatus, and parts or areas of the fuse plug would then abut against the housing of the fused switch unit. The interlocking apparatus accordingly secures the switch plug in a longitudinal position in which it is pushed out of the operating position in the fused switch unit.

The through-openings in the fuse plug and in the fused switch unit, or in its components (for example the switching rocker) preferably have an essentially congruent cross section. This results in the two through-openings overlapping completely, so that an interlocking apparatus can be inserted without any problems through the through-holes. It is also possible to use interlocking apparatuses whose cross-sectional dimensions are matched to an identical cross section of the two through-openings, so that no axial play is possible between the fuse plug and the fused switch unit as soon as such an interlocking apparatus is inserted.

In one embodiment, the through-opening in the fuse plug is slightly smaller than the through-opening in the fused switch unit or in the switching rocker. Since the fuse plug is inserted into the fused switch unit or into the switching rocker, a certain amount of play between the fuse plug and the fused switch unit is essential for production reasons, as well as to avoid excessive friction, and hence wear. This therefore results in slight position fluctuations in a direction other than the insertion direction. A slightly smaller hole in the fuse plug thus means that the through-opening in the fuse plug can always completely overlap the through-opening in the fused switch unit even in the event of any possible deflection of the fuse plug, caused by play, in a direction other than the insertion direction.

It is also advantageous to provide insertion aids by the through-openings in the fuse plug and/or in the fused switch unit widening outward.

In one preferred embodiment, the through-openings in the fuse plug and in the fused switch unit do not overlap, or overlap only slightly, when the fuse plug is in its operating position. This makes it impossible to use objects of very small size as an interlocking apparatus, which can actually be inserted through any overlap which may possibly exist between the through-openings, for example caused by production tolerances, when the fuse plug is still in its operating position, A fuse plug preferably has a holding area, which lies against a housing, in particular against a positioning apparatus on the housing, as soon as the openings are aligned, or at least partially overlap. In particular, such a holding area is designed such that it interacts with the housing, or with the positioning apparatus on the housing, in order to reliably hold the fuse plug or the switching rocker in its switched-off position. It is advantageous to design this holding area such that a reliable holding function is still provided even after a large number of operations and after the possible occurrence of wear, in particular erosion.

The holding area is composed, in particular, of a part of a side wall of the retaining area for a fuse link. This thus avoids additional design measures, keeping the component costs low.

The housing of the fused switch unit preferably has stop surfaces for the switching rocker and/or the fuse plug, against which both components lie when the switching rocker is in the switched-on position or switched-off position. These stop surfaces assist reliable positioning of the switching rocker or of the fuse plug, so that this also reduces the risk of incorrect positioning or incorrect operations.

In one embodiment, the housing of the fused switch unit has a positioning apparatus against which the holding area of the fuse plug lies as soon as the through-holes in the fuse plug and in the fused switch unit overlap. The stop surface for the fuse plug and the positioning apparatus on the housing are preferably designed in a standard manner. This refinement likewise avoids the risk of incorrect operation, and a long life is

BRIEF DESCRIPTION OF THE DRAWINGS

The invention will be described in more detail in the following text with reference to schematic drawings of one preferred embodiment of the invention, and in which.

DETAILED DESCRIPTION OF THE PREFERRED EMBODIMENTS

Figure 1:
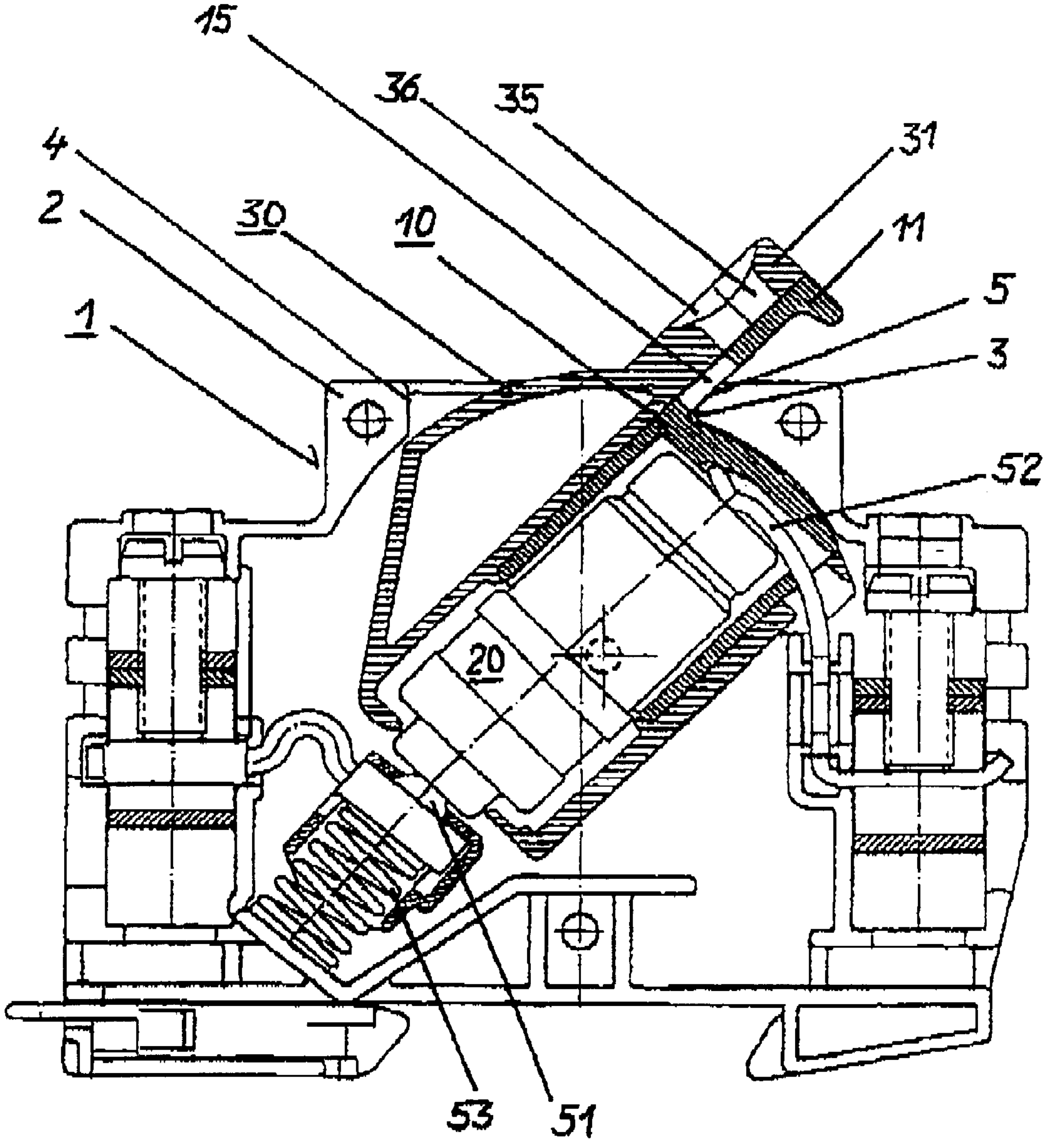
FIG. 1 shows a cross-sectional view of a first embodiment of a fused switch unit with a switching rocker and a fuse plug, with the switching rocker being in the switched-on position.

FIG. 1 clearly shows the structural design of a fused switch unit 1, of a switching rocker 30 and of a fuse plug 10 according to the invention.

Figure 2:
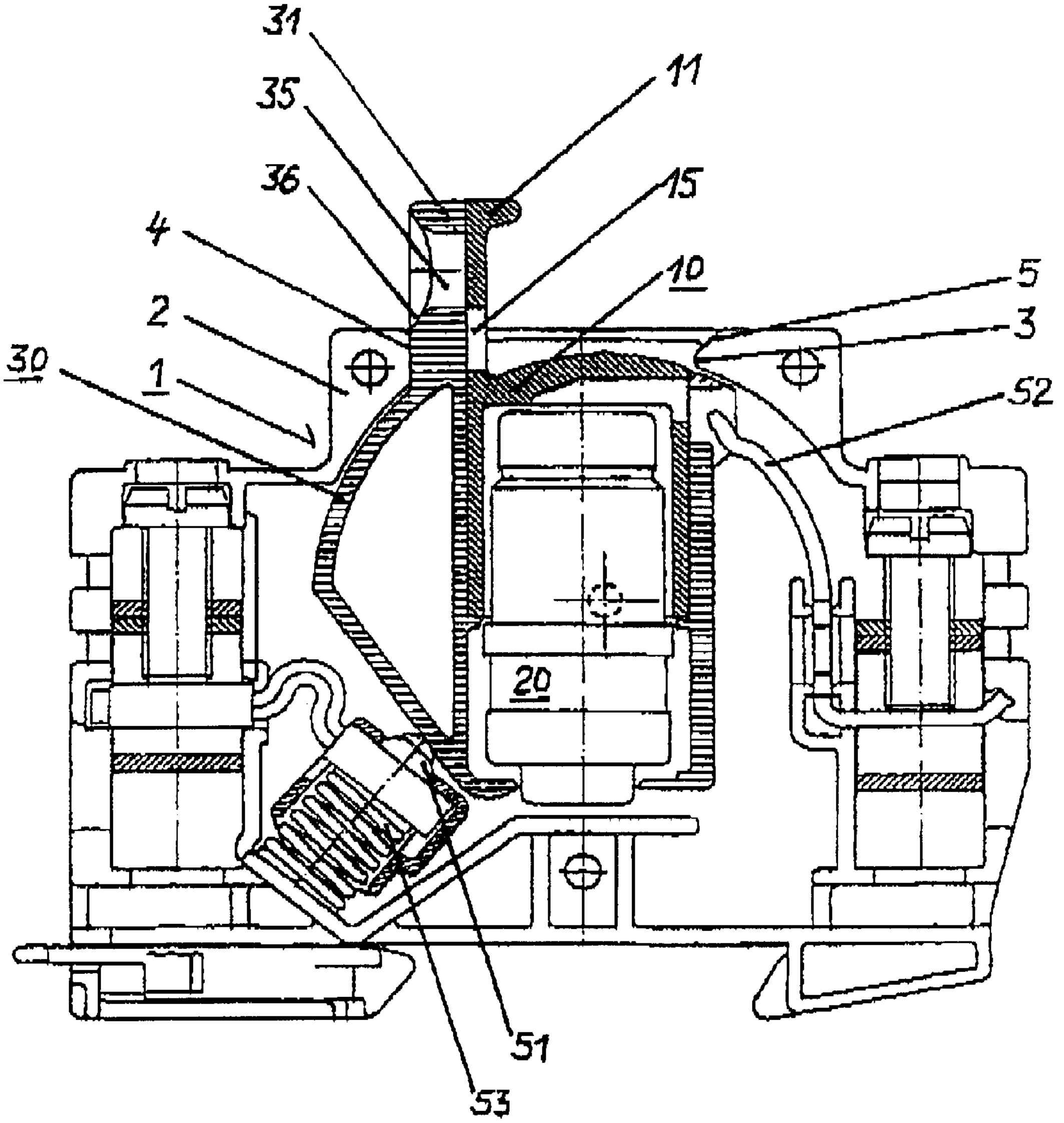
FIG. 2 shows a cross-sectional view of the embodiment shown in FIG. 1, with the switching rocker being in the switched-off position.

The fused switch unit 1 has a housing 2, in which a switching rocker 30 is mounted so that it can pivot, so that it can pivot between the switched-on position shown in FIG. 1, and the switched-off position shown in FIG. 2. A fuse plug 10 is inserted into the switching rocker 30, and is in its limit position in FIG. 1. A fuse link 20 is inserted into the fuse plug 10 and makes contact on two sides with contact apparatuses 51, 52, in order to close the circuit. The fuse plug 10 has a grip part 11, in which a through-opening is incorporated.

The switching rocker 30 is provided with an operating grip 31, in which a through-opening 35 is incorporated. On the side facing away from the fuse plug 10, the through-opening 35 has an insertion aid 36 which is formed by widening 36 the through-opening 35 like a funnel. The through-opening 15 could also, of course, be widened on its side facing away from the operating grip 31, in the sense of an insertion aid.

The two through-openings 15 and 35 are offset in the insertion direction and are positioned at a distance from one another such that they do not overlap and are not aligned with one another, so that no interlocking apparatus can be inserted through the through-openings 15, 35 when and for as long as the fuse plug 10 is in its operating position.

In the switched-on position shown here, the fuse plug 10, or a part of the grip part 11 of the fuse plug 10, lies against a stop surface 5 on the housing 2.

The stop surface 5 is designed to match a positioning apparatus 3. The function of the positioning apparatus 3 will be explained in more detail later, In conjunction with FIG. 3.

Furthermore, the housing 2 has a further stop surface 4, against which the switching rocker 30 or its operating grip 31 lies when the switching rocker 30 is in its switched-off position shown in FIG. 2. This clearly shows that the contacts 51 and 52 no longer make contact with the fuse link 20 and, in consequence, the circuit is interrupted. All the reference symbols and parts in FIG. 2 correspond to those shown in FIG. 1.

In FIG. 2, the fuse plug 10 is still in its limit position in the switching rocker 30, so that the relative positions of the spaced-apart through-opening 15 in the fuse plug 10 and the through-opening 35 in the switching rocker 30 have not changed. The switching rocker 30 can thus be moved back to its switched-on position, as shown in FIG. 1, by applying force to the operating grip, to the right in FIG. 2; however, it is impossible to insert an interlocking apparatus through the through-openings 15, 35, since they do not overlap. The switching rocker 30 is thus in an unsecured switched-off position, with this switched-off position being maintained only by a spring apparatus 53. As is shown in FIG. 2, a pivoting movement in the direction of the switched-on position requires the spring 53 to be compressed, and thus requires force to be applied.

Figure 3:
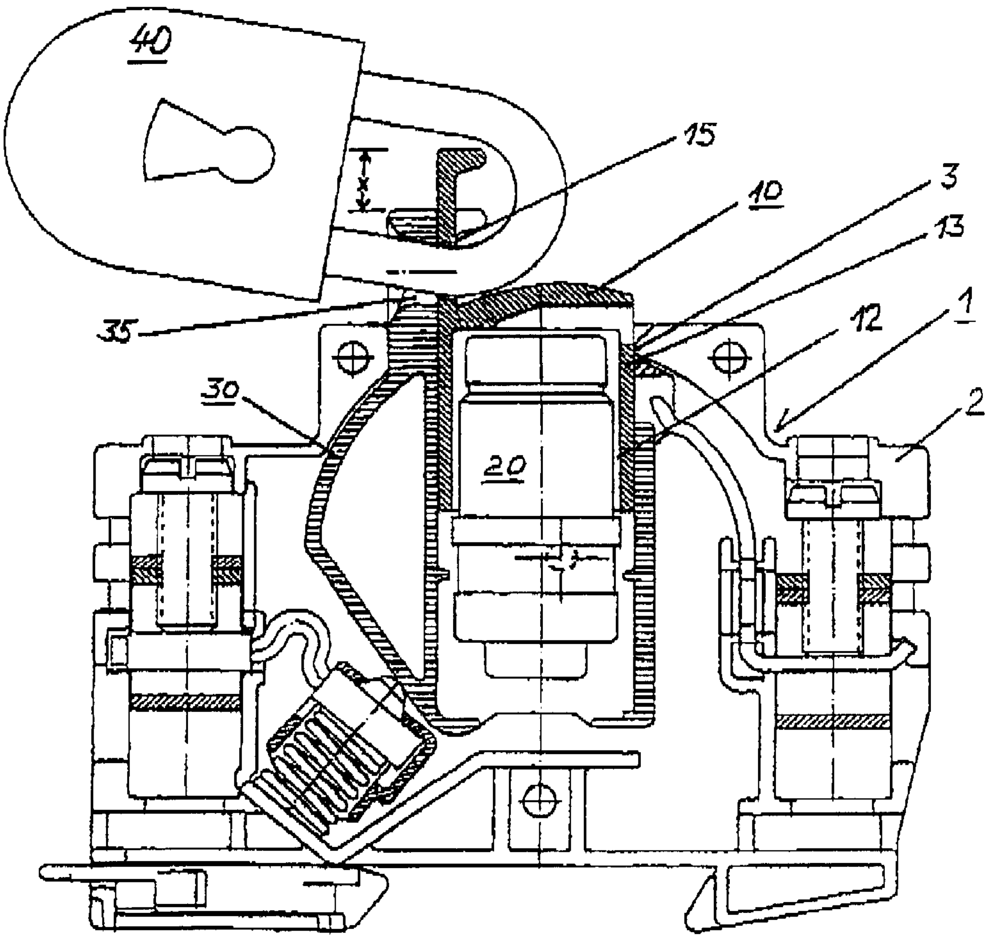
FIG. 3 shows a cross-sectional view of the embodiment illustrated in FIGS. 1 and 2, with the switching rocker being secured in the switched-off position.

FIG. 3 shows the embodiment illustrated in FIGS. 1 and 2, with the fused switch unit 1 in a secured switched-off position.

The fuse plug 10 is withdrawn from its limit position in the switching rocker 30, in the direction of the insertion opening in the switching rocker 30, through a length x, which in this embodiment is approximately 7 mm. The through-opening 15 in the fuse plug 10 is now completely aligned with the through-opening 35 in the switching rocker 30.

The relative position of the switching rocker 30 and of the fuse plug 10 is secured by means of an interlocking apparatus, in this case a schematically illustrated standard conventional padlock 40, which has been passed through the two through-openings 15 and 35. This therefore prevents the fuse plug 10 from being moved to its limit position, or out of the switching rocker 30.

The longitudinal movement of the fuse plug 10 out of the switching rocker 30 means that a holding area 13, which is formed by one side wall of a retaining area 12 for the fuse link 20, now lies against the positioning apparatus 3 on the housing 2. In consequence, the system comprising the switching rocker 30 and the fuse plug 10 cannot be pivoted in the direction of the switched-on position of the switching rocker 30, so that the fuse plug 10 is locked away from its limit position and the switching rocker 30 is locked in the switched-off position.

As can clearly be seen from FIG. 3, the interlocking apparatus 40, in this case the padlock, is not subject to any particular geometric or structural requirements. It just needs to be sufficiently large to allow the interlocking apparatus to pass through the through-openings.

Figure 4:
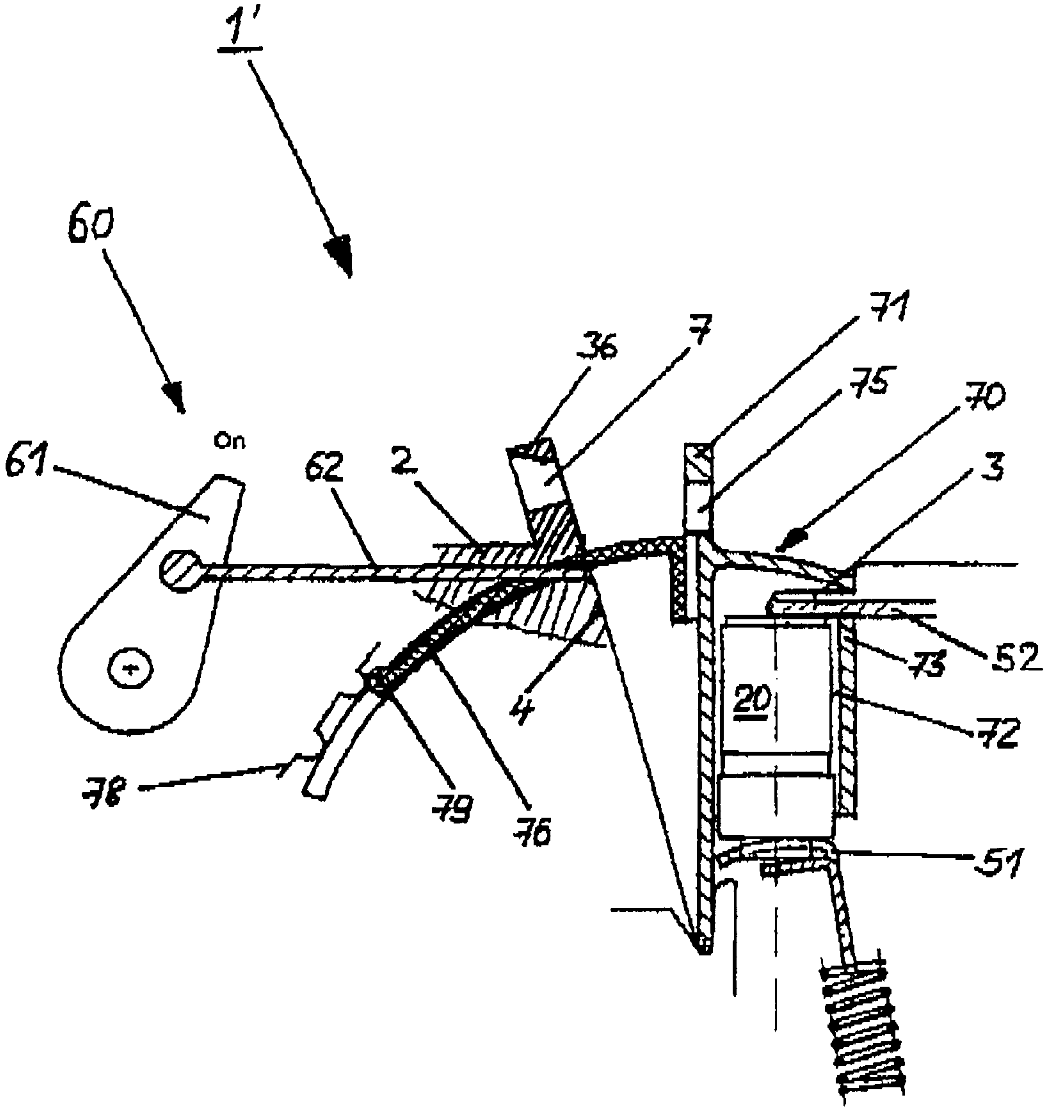
FIG. 4 shows a cross-sectional view of a second embodiment of a fused switch unit with a fuse plug, with the fuse plug being in the switched-on position.

FIG. 4 shows a second embodiment of a fused switch unit 1' according to the invention. This embodiment has no switching rocker, but only a fuse plug 70, on which a guide element 76 is arranged.

Otherwise, the design of the fuse plug 70 essentially corresponds to the design of the fuse plug 10 used in the first embodiment. The fuse plug 70 has a grip part 71 with a through-opening 75, a retaining area 72 for the fuse link 20, and a holding area 73.

The guide element 76 is mounted at the side, in the vicinity of the grip part 71 of the fuse plug 7D. The guide element 76 is guided within the housing 72 of the fused switch unit 1', and has a latching element 79 which engages with (highly schematically illustrated) latching elements 78 on the fused switch unit when the fuse plug 70 is in the switched-on and switched-off positions, so that this results in latched limit positions.

The guide element 76 furthermore has a blocking opening 80, in which a blocking bolt 62 of a switching and blocking apparatus 60 engages when the switching and blocking apparatus 60 is moved to the on position by means of an operating switch 61. When the fuse plug 70 is in its switched-off position, the operating switch 71 of the switching and blocking apparatus 60 cannot be moved to the on position, because the blocking bolt 62 cannot be inserted into the blocking opening 80.

Figure 5:
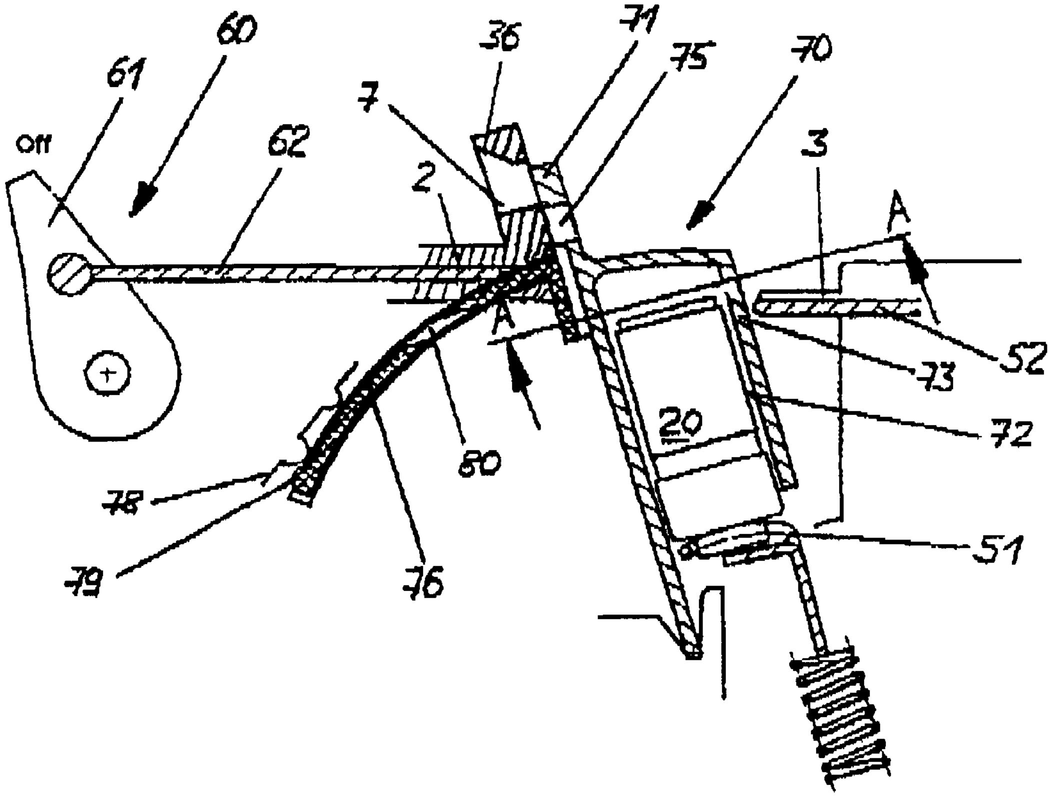
FIG. 5 shows a cross-sectional view of the embodiment shown in FIG. 4, with the fuse plug being in the switched-off position.

The housing 2 of the fused switch unit 1' has a pin, having a through-opening 7 with an insertion aid 36. FIG. 5 clearly shows the positioning of the through-opening 7 in the housing 2 with respect to the through-opening 75 in the grip part 71 of the fuse plug 70.

The fuse plug 70 is in its switched-off position in FIG. 5, and the contact apparatus 52 is no longer in contact with the fuse link 20.

The fuse plug 70 is in its operating position, and the through-openings 75 and 7 do not overlap, so that it is impossible to pass an interlocking element through the through-openings 7, 75.

An interlocking apparatus cannot be passed through the openings 7, 75 until the fuse plug 70 has been withdrawn from its operating position (not shown), as is shown analogously in FIG. 3.

As explained in conjunction with FIG. 3, withdrawal of the fuse plug 70 from its operating position leads to the holding area 73 of the fuse plug 70 abutting against the positioning apparatus 3 or the contact apparatus 52, so that the fuse plug 70 cannot be pivoted to its switched-on position.

Figure 6:
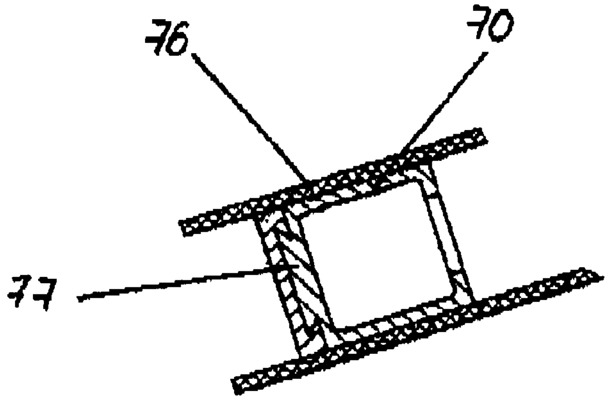
FIG. 6 shows a cross-sectional view along the line A—A shown in FIG. 5.

FIG. 6 shows a cross section along the line A—A shown in FIG. 5. This shows, in particular, how the fuse plug 70, which has a connecting element 77 in the form of a dovetail, engages in a corresponding recess in the guide element 76. The fuse plug 70 is thus connected in a positively locking manner, and with a friction fit, to the guide element 76, simply by inserting it into the fused switch unit 1'.

It shall be mentioned once again that the Figures are only schematic illustrations and, in particular, that no restrictions relating to the dimensioning of the illustrated elements whatsoever may be derived from the Figures.

List of Reference Symbols

1, 1' Fused switch unit
2 Housing
3 Positioning apparatus
4 Stop surface
5 Stop surface
7 Through-opening (housing)
10 Fuse plug
11 Grip part (fuse plug)
12 Retaining area
13 Holding area
15 Through-opening (fuse plug)
20 Fuse link
30 Switching rocker
31 Operating grip (switching rocker)
35 Through-opening (switching rocker)
36 Insertion aid
40 Interlocking apparatus
51 Contact apparatus
52 Contact apparatus
53 Spring
60 Switching and blocking apparatus
61 Operating switch
62 Blocking bolt
70 Fuse plug
71 Grip part
72 Retaining area
73 Holding area
75 Through-opening (fuse plug)
76 Guide element
77 Connecting element
78 Latching element
79 Latching element
80 Blocking opening What is claimed is:

What is claimed is:

1. A fused switch unit with a housing (2) in which a fuse plug (10, 70) is arranged such that it can pivot to and fro between a switched-off position and a switched-on position, with the fuse plug (10, 70) having a grip part (11, 71) and a retaining area (12, 72) for a fuse link (20) and being capable of being pushed into the fused switch unit (1) as far as an operating position, wherein both the fused switch unit (1, 1') and/or associated components (2, 30) as well as the grip part (11, 71) of the fuse plug (10, 70) each have a through-opening (7, 15, 35, 75), which through-openings (7, 15, 35, 75) are positioned such that they essentially do not overlap when the fuse plug (10, 70) is in its operating position, and such that they are at least partially aligned with one another in order to hold an interlocking element (40) when the fuse plug (10, 70) is in a position in which it is partially withdrawn from its operating position in the fused switch unit (1).

2. The fused switch unit as claimed in claim 1, wherein said unit has a switching rocker (30) which as arranged such that it can pivot to and fro between a switched-on position and a switched-off position, and into which a fuse plug (10) can be pushed as far as an operating position.

3. The fused switch unit as claimed in claim 1 or 2, wherein the through-opening (15, 75) in the fuse plug (10, 70) and the through-opening (7, 35) have approximately the same cross section.

4. The fused switch unit as claimed in claim 1 or 2, wherein the through-opening (15, 75) in the fuse plug (10, 70) is smaller than the through-opening (7, 35) in the fused switch unit 1, 1') and/or associated components (2, 30).

5. The fused switch unit as claimed in claim 1, wherein at least the through-opening (7, 35) in the fused switch unit has an insertion aid (36), in particular a conically widening opening, for the interlocking element (40).

6. The fused switch unit as claimed in claim 5, wherein the at least one insertion aid (36) is provided only on the side facing away from the grip (11, 71) of the fuse plug (10, 70).

7. The fused switch unit as claimed in claim 1, wherein the fuse plug (10, 70) has a holding area (13, 73) for a fuse link (20), which rests against a positioning apparatus (3) formed by a housing (2) of the fused switch unit (1), as soon as the through-opening (15) in the fuse plug (10) is at least partially aligned with the through-opening (35) in the switching rocker (30).

8. The fused switch unit as claimed in claim 1, wherein the housing (2) has at least one stop surface (4, 5) for the switching rocker (30) and/or for the fuse plug (10, 70) which can be engaged by the switching rocker (30) and/or the said fuse plug (10, 70) in their switched-on position or switched-off position.

9. The fused switch unit as claimed in claim 1, wherein the housing (2) has at least one positioning apparatus (3) against which the holding area (13, 73) of the fuse plug (10, 70) can lie.

10. The fused switch unit as claimed in claim 1, wherein the at least one stop surface (4) for the fuse plug (10, 70), and the at least one positioning apparatus (3), are an integral component of the housing (2) or of the fuse plug (10, 70).

* * * * *